United States Patent [19]

Nakatsuji

[11] Patent Number: 4,970,925

[45] Date of Patent: Nov. 20, 1990

[54] DIE PRESS WITH AUTOMATICALLY CONTROLLED WORKPIECE HOLDER

[76] Inventor: Sanji Nakatsuji, c/o Sanko Industries Limited, 5 Suzukawa, Isehara City, Kanagawa Prefecture, Japan

[21] Appl. No.: 314,715

[22] Filed: Feb. 23, 1989

[30] Foreign Application Priority Data

Feb. 24, 1988 [JP] Japan ................................ 63-41296

[51] Int. Cl.$^5$ .......................... B26D 3/14; B26D 7/02
[52] U.S. Cl. ......................................... 83/384; 83/54;
83/387; 83/454; 83/693; 83/917
[58] Field of Search ................. 83/452, 453, 454, 455,
83/456, 319, 320, 517, 383, 384, 385, 386, 387,
300, 382, 374, 376, 378, 54, 588, 692–693, 917

[56] References Cited

U.S. PATENT DOCUMENTS

| | | | |
|---|---|---|---|
| 931,006 | 8/1909 | Bascom | 83/385 |
| 2,579,675 | 12/1951 | Kaplan et al. | 83/383 |
| 3,099,182 | 2/1961 | Alverson | 83/383 |
| 4,036,091 | 7/1977 | Borzym | 83/319 |
| 4,294,147 | 10/1981 | Borzym | 83/382 |
| 4,337,680 | 7/1982 | Borzym | 83/456 |
| 4,563,927 | 1/1986 | Kinsley | 83/319 |
| 4,766,792 | 8/1988 | Borzym et al. | 83/319 |

*Primary Examiner*—Frank T. Yost
*Assistant Examiner*—Kenneth E. Peterson
*Attorney, Agent, or Firm*—Wood, Phillips, Mason, Recktenwald and VanSanten

[57] ABSTRACT

A die press consisting of: a bed on which a workpiece is supported in operating position; a die holder movable between a retracted position and an extended position; a workpiece holder mounted for movement relative to the bed between a holding position and a release position; and cooperating structure on the die holder, bed, and workpiece holder for moving the workpiece holder from its release position to its holding position as an incident of the die holder moving from its retracted position towards its extended position. The workpiece holder in its holding position maintains a workpiece in operating position on the bed.

16 Claims, 3 Drawing Sheets

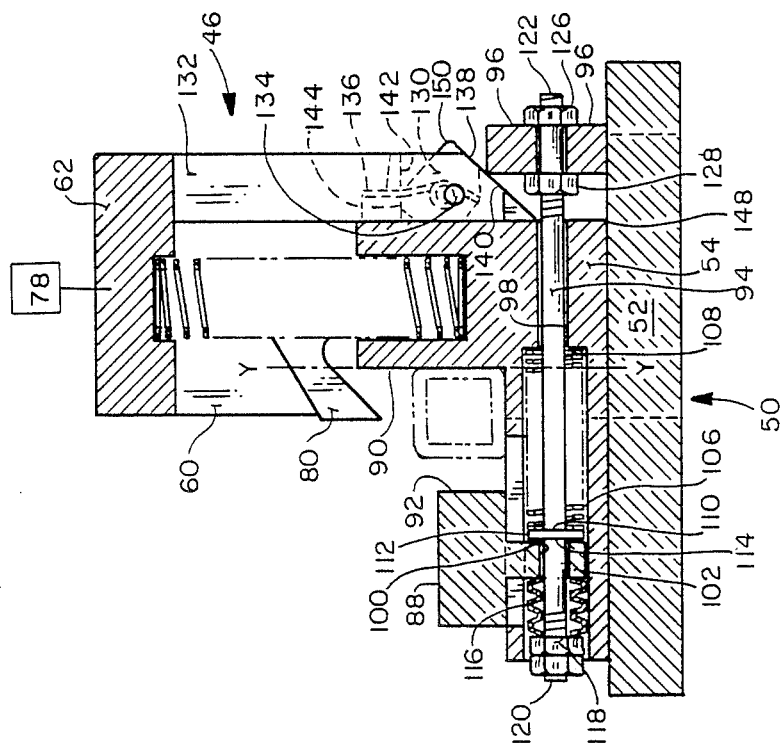
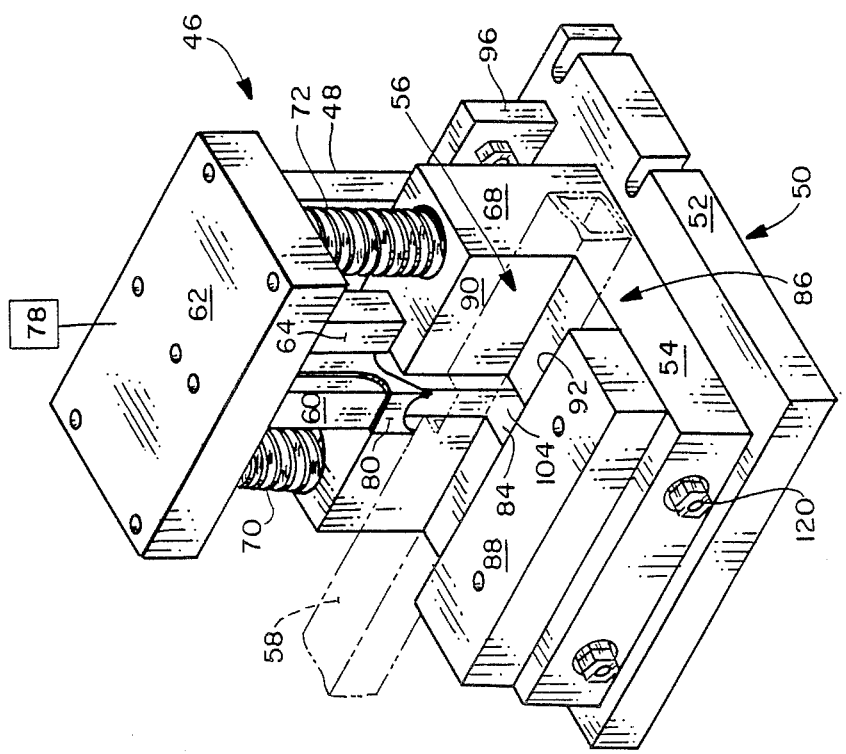

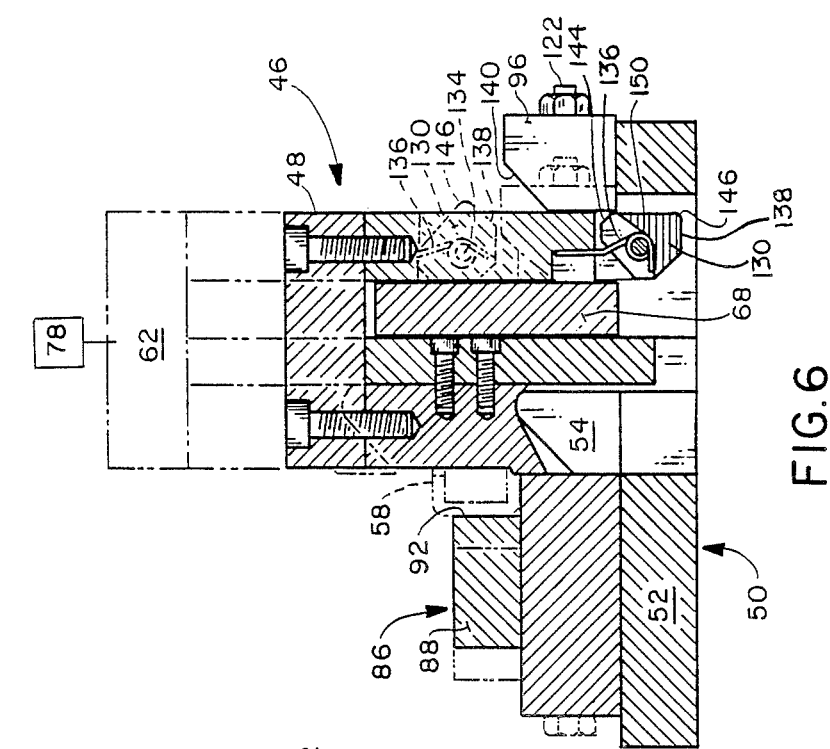
FIG. 6
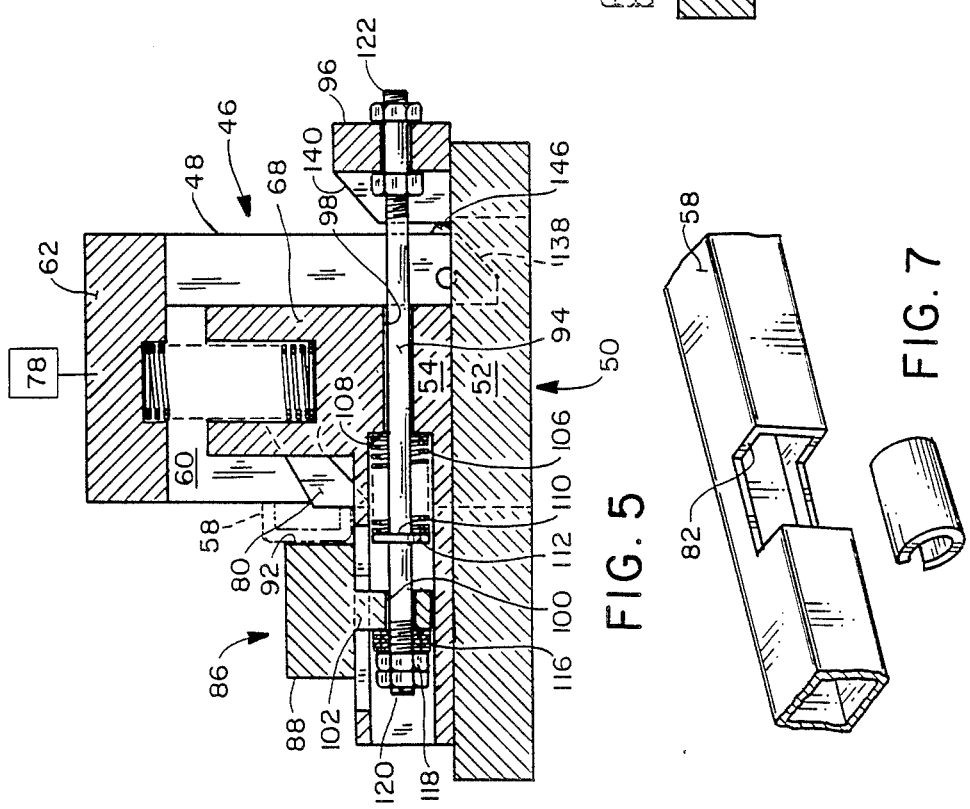
FIG. 5
FIG. 7

DIE PRESS WITH AUTOMATICALLY CONTROLLED WORKPIECE HOLDER

BACKGROUND OF THE INVENTION

1. Field of the Invention

This invention relates to die presses, as used to stamp workpieces, and, more particularly, to a die press with a workpiece holder that is automatically controlled as the die press is operated.

2. Background Art

Hydraulically operated die presses are commonly used to stamp out tubular stock so as to facilitate formation of furniture and the like therefrom. These presses are conventionally operated using a reciprocatively mounted die holder which forcibly moves a cutting die thereon against a workpiece held strategically positioned on a bed relative to which the die holder moves.

It is important with such presses that workpieces be held positively in place. The workpieces are subjected to very large forces during press operations. Inadvertent release of the workpiece as a press operation is performed may cause destruction of the workpiece, damage to the press and/or injury to the press operator.

It is conventional to use a hydraulically or pneumatically operated cylinder to urge a slidable workpiece holder against a workpiece to maintain the same in place. While such cylinders generally effectively hold workpieces in place, they have numerous drawbacks.

The hydraulic cylinder takes up a significant amount of valuable space. The result is a relatively large overall press size. Further, the cylinder interferes with the press operator's access to the workpiece. Often this results in improper location of the workpiece by the operator on the press so that the workpiece is improperly formed. Accuracy and consistency in processing are thus difficult to achieve.

A further drawback with the conventional workpiece holders utilizing hydraulic/pneumatic cylinders is that the press operator must separately control the cylinder during an operation. The extra control step is inconvenient and time consuming. For example, the press operator must align the workpiece where desired and then manually operate the cylinder to lock the workpiece in place. After the press operation is completed, the press operator retracts the cutting die and then manually releases the pressure on the cylinder so that the workpiece can be removed from the press.

SUMMARY OF THE INVENTION

The present invention is specifically directed to overcoming the above-enumerated problems in a novel and simple manner.

According to the invention, a die press consists of: a bed on which a workpiece is supported in operating position; a die holder movable between a retracted position and an extended position; a workpiece holder mounted for movement relative to the bed between a holding position and a release position; and cooperating structure on the die holder, bed, and workpiece holder for moving the workpiece holder from its release position to its holding position as an incident of the die holder moving from its retracted position towards its extended position. The workpiece holder in its holding position maintains a workpiece in operating position.

With the inventive structure, it is possible for the press operator to carry out an operation in two simple steps. The workpiece is appropriately positioned and thereafter the die holder is extended to direct the cutting die thereon against and through the workpiece. The workpiece holder automatically moves into its holding position as the die holder is moved from its retracted position into its extended position.

Another aspect of the invention is the provision of structure to move the workpiece holder from its holding position to its release position as an incident of the die holder moving from its extended position towards its retracted position. This obviates the need to manually release the workpiece holder as is required in conventional systems utilizing hydraulic/pneumatic cylinders to clamp workpieces in place.

The workpiece holder is normally biased towards its release position. Preferably the biasing is accomplished by one or more coil springs.

The workpiece holder has an associated rod, which is guided in translation relative to the bed. The guide rod carries the workpiece holder and a heel at a location spaced from the location of the workpiece holder. The die holder has a cam which cooperates with the heel to move the workpiece holder. The cam is movable relative to the die holder between an operative position and a reset position. With the cam in its operative position and the die holder moved from its retracted position towards its extended position, a first surface on the cam engages the heel and shifts the rod, and in turn the workpiece holder, against the spring bias into the holding position for the workpiece holder. Upon the die holder being retracted from its extended position, a second surface on the cam engages the heel and causes the cam to be rotated from its operative position to its reset position. In the reset position, the cam causes the heel to situate so that the workpiece holder resides in its release position. A spring normally biases the cam into its operative position. Upon the die holder being retracted, the cam clears the heel and moves under the bias of the associated spring from its reset position into its operative position, whereupon the press is set for the performance of another stamping operation.

In a preferred form, the die holder is translatable in a linear path between its extended and retracted positions. The workpiece holder is also preferably movable in a linear path between its holding position and release position. The lines of movement of the workpiece holder and die holder are transverse to each other, and in a preferred form are at right angles with respect to each other.

BRIEF DESCRIPTION OF THE DRAWINGS

FIG. 3 is a perspective view of the die press in FIG. 2 with a workpiece thereon in operating position;

FIG. 4 is a side elevation view of the die press in FIGS. 2 and 3 with a vertically movable die holder having a cutting tool thereon in a retracted position;

FIG. 5 is a view as in FIG. 4 with the die holder extended downwardly from the FIG. 4 position;

FIG. 6 is a view as in FIG. 5 with the die holder extended downwardly from the FIG. 5 position; and FIG. 7 is a perspective view of an exemplary workpiece stamped with the cutting tool shown on the inventive die press.

DETAILED DESCRIPTION OF THE DRAWINGS

Figure 2:
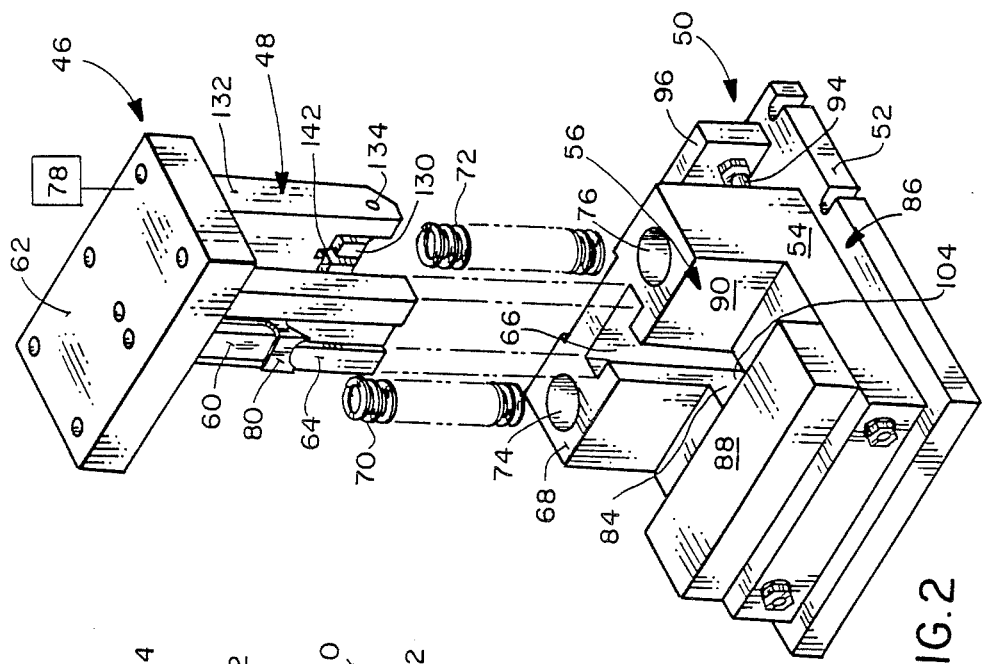
FIG. 2 is an exploded, perspective view of a die press according to the present invention.
Figure 1:
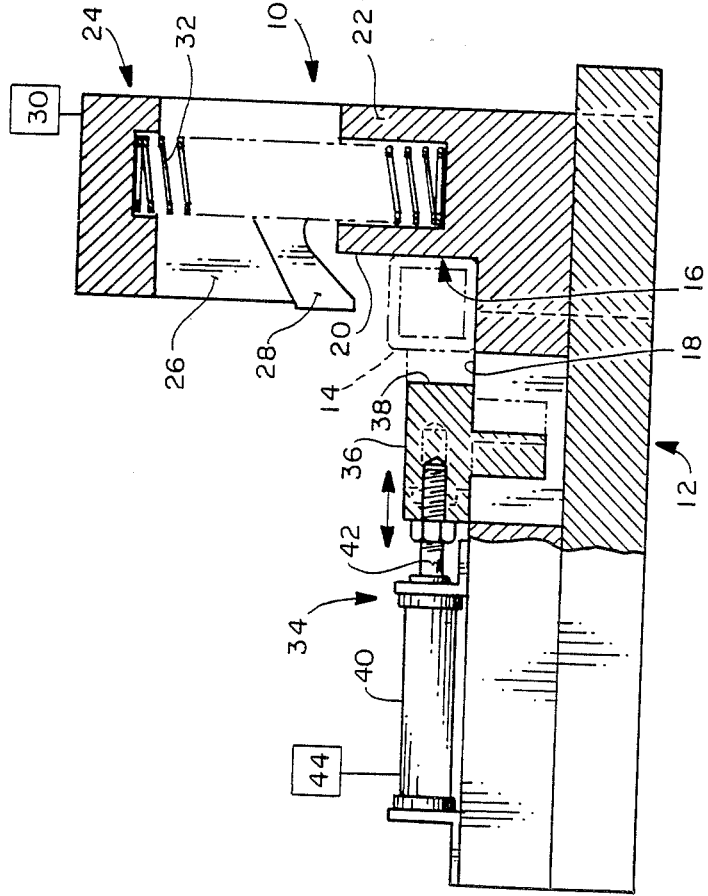
FIG. 1 is a side elevation view of a prior art die press.

A prior art die press is shown at 10 in FIG. 1. The die press 10 consists of a bed 12 for supporting a tubular workpiece 14. The workpiece 14 nests in a seat 16 defined cooperatively by an upwardly facing surface 18 at the base of the bed 12 and an upwardly extending flat surface 20 on an upright portion 22 of the bed 12.

A die holder 24 is mounted to the bed 12 for reciprocating vertical movement. The die holder 24 has a cutting tool 26 with a cutting blade 28 that acts against the workpiece 14 as the die holder 24 is lowered. The die holder 24 is operated by a conventional type hydraulic/pneumatic drive, shown schematically at 30 in FIG. 1. The die holder 24 is normally biased upwardly to a retracted position by at least one coil spring 32, interposed between the die holder 24 and bed 12.

As the drive 30 is operated, the workpiece 14 is subjected to a large force by the cutting blade 28. It is therefore necessary to hold the workpiece 14 positively in place to assure consistent direction of the cutting blade 28 into the workpiece 14 and to prevent the workpiece 14 from skewing or being wedged out whereby it might damage the press 10 and/or injure the press operator. To accomplish this, a workpiece holding assembly is provided at 34.

The workpiece holding assembly 34 consists of a workpiece holder 36, which is translatable from the solid line position in FIG. 1 towards and against the workpiece 14 so that the workpiece 14 is captively maintained between a flat surface 38 on the workpiece holder 36 and the facing surface 20 on the bed 12. Movement of the workpiece holder 36 is effected through a pneumatic/hydraulic cylinder 40 fixedly secured to the bed 12. The cylinder 40 has an extendable rod 42 which is connected to the workpiece holder 36. The cylinder 40 is manually operated through a conventional control, shown at 44 in FIG. 1.

To perform a cutting operation with the cutting tool 26, the die holder 24 at setup is retracted to the FIG. 1 position. The workpiece 14 is placed in the seat 16 and thereafter the control 44 is operated to extend the rod 42 relative to the cylinder 40 so that the rod 42 bears the workpiece holder 36 against the workpiece 14 so that the workpiece 14 is securely held between the workpiece holder 36 and the flat surface 20 on the upright portion 22 of the bed 12. The cutting tool 26 is directed through the workpiece 14 by operating the drive 30. At the completion of the cutting operation the die holder 24 is raised and the control 44 is manually operated to withdraw the rod 42 and thereby back the workpiece holder 36 off of the workpiece 14 so that the workpiece 14 can be removed.

The present invention obviates the need to manually control the position of the workpiece holder 36. The inventive die press is shown in FIGS. 2–6 at 46.

The die press 46 consists of a die holder 48 and a cooperating bed 50. The bed 50 has a base 52 and a female die 54 supported upon the base 52. The die 54 defines a seat 56 for a workpiece 58 (see also FIG. 7) upon which a stamping operation is to be performed utilizing a cutting die 60.

The cutting die 60 is carried on the die holder 48, which is mounted to the bed 50 for guided, reciprocating movement between a retracted position, shown in FIG. 4, and an extended position, shown in FIG. 5. The die holder 48 has a support block 62 from which a male guide rail 64 depends. The cutting die 60 is releasably attached to the guide rail 64 and the support block 62 in a fixed position. The rail 64 is guidingly accepted in a slot 66 in an upright portion 68 of the female die 54 on the bed 50. The slot 66 has a cross section matched to that of the guide rail 64.

Spaced coil springs 70, 72 are received in seats 74, 76 respectively, act between the bed 50 and die holder 48, and bias the die holder 48 towards its retracted position. In the retracted position of FIG. 4, the workpiece 58 can be readily placed in its operating position and removed therefrom.

The press 46 is arranged so that each stroke of the die holder 48 produces a desired cut in the workpiece 58. A drive 78 for the die holder 48 moves the die holder 48 selectively upwardly and downwardly relative to the bed 50. The drive 78 may be operated hydraulically, pneumatically, electrically, or by any other suitable means. The drive 78 forcibly moves the cutting blade 80 on the cutting die 60 against the workpiece 58.

The particular cutting die 60 that is utilized is not important for purposes of understanding the present invention. The cutting blade 80 shown produces a square cut-out 82 in the workpiece 58, as shown in FIG. 7. The die 54 has an opening 84 therein to permit passage of the cutting die 60 entirely through the workpiece 58 upon the die holder being fully extended downwardly.

The present invention is concerned with a workpiece holding assembly, shown at 86. The workpiece holding assembly 86 has a workpiece holder 88, which is translatable towards and away from a surface 90 on the upright portion 68 of the die 54. The workpiece holder 88 has a surface 92 facing the surface 90 on the die 54 to cooperate with the surface 90 to captively maintain the workpiece 58 in its operating position.

Movement of the workpiece holder 88 is effected by a rod 94, carrying the workpiece holder 88, and a heel 96 on the rod, which heel 96 cooperates with the die holder 48 in operation. The rod 94 is translatable horizontally within a bore 98 through the die 54. The rod 94 extends through a bore 100 in a leg 102 on the workpiece holder 88, which leg 102 is received in a slot 104 in the die 54. The slot 104 guides translatory movement of the workpiece holder 88 between the release position, shown in FIG. 4, and the holding position, shown in FIG. 6. A coil spring 106 surrounds the rod 94 and is interposed between a surface 108 on the die 54 and a shoulder 110, defined by a radially enlarged bead 112, integrally formed with the rod 94. The coil spring 106, bearing on the shoulder 110, urges the rod 94 against the leg 102 on the workpiece holder 88 so that the workpiece holder 88 is urged towards it release position i.e. towards the left in FIGS. 2–6. The leg 102 is maintained against a shoulder 114 on the bead 112 by a spring 116 which is captive between the leg 102 and a nut 118 threaded onto the end 120 of the rod 94.

At the end 122 of the rod 94 remote from the rod end 120, the heel 96 is provided. The heel 96 is secured in fixed position lengthwise of the rod 94 by two nuts 126, 128 on opposite sides of the heel 96.

The heel 96 cooperates with a cam 130 carried by a depending leg 132 on the die holder 48. The cam 130 is rotatably mounted to the die holder 48 on a post 134. The cam 130 is rotatable about an axis that is at right angles to the line of translation of the workpiece holder 88 between an operating position, shown in FIG. 4, and a reset position, shown in FIG. 6. A wire spring 136 surrounds the post 134 and is loaded so as to normally bias the cam 130 in a counterclockwise direction and thereby into its operating position.

The cam 130 has a downwardly facing, inclined first surface 138 which bears on an upwardly facing, inclined surface 140 on the heel 96 as the die holder 48 is moved downwardly from the FIG. 4 position. The surfaces 138, 140 are substantially parallel. Upon the die holder 48 being moved downwardly from the FIG. 4 position, the cam surface 138 acts against the surface 140 and thereby causes the heel 96 to be shifted towards the right. The heel 96 draws with it the rod 94 and workpiece holder 88. The force from the rod 94 is transmitted to the workpiece holder 88 through the spring 116. By adjusting the nut 118, the force of spring 116 can be varied.

The force from the die holder 48 is positively transmitted by a downwardly facing surface 142 thereon to an upwardly facing surface 144 on the cam 130. Upon the die holder 48 being extended downwardly beyond the FIG. 5 position, a nose 146 on the cam 130 clears the bottom edge 148 of the heel 96. This occurs as the die holder 48 reaches its fully extended position. The heel edge 148 then bears against a second inclined surface 150 on the cam 130 and shifts to the left under the force of spring 106 so that the workpiece holder 88 assumes its release position. Upward movement of the die holder 48 causes the heel edge 148 to bear against the cam surface 150 and thereby urge the cam 130 in a clockwise direction to the reset position shown in FIG. 6. With the cam 130 in its reset position, the workpiece holder 88 remains in its release position as the die holder 48 is moved to its retracted position. The workpiece 58 can then be removed and replaced with another workpiece 58.

Upon the die holder 48 being moved upwardly from the FIG. 6 position, the cam nose 146 achieves vertical coincidence with the heel surface 140. Rotation of the cam 130 in a counterclockwise direction under the influence of the spring 136 is then permitted. Upon the die holder 48 being fully retracted, the cam 130 resides in its operating position and the workpiece holder 88 is in its release position in FIG. 4 so that the aforementioned press operation can again proceed.

It can be seen that the press operator need only place and remove the workpiece 58 and operate the drive 78. The workpiece holding assembly 86 operates automatically. The need for a cylinder 40, as in the prior art structure in FIG. 1, is obviated so that the space occupied by the cylinder 40 in conventional press assemblies is available and can be utilized by the press operator.

The foregoing disclosure of specific embodiments is intended to be illustrative of the broad concepts comprehended by the invention.

I claim:
1. A die press comprising:
   a bed;
   means on the bed for supporting a workpiece on which an operation is to be performed by the die press in an operating position;
   a die holder;
   first cooperating means on the bed and die holder for guiding the die holder in movement between (a) a retracted position and (b) an extended position;
   a workpiece holder;
   means for mounting the workpiece holder to the bed for movement relative to the bed between (a) a holding position and (b) a release position,
   said workpiece holder situated to maintain a workpiece in said operating position with the workpiece holder in its holding position;
   second cooperating means on the die holder, bed and workpiece holder for moving the workpiece holder from the release position to the holding position as an incident of the die holder moving from its retracted position towards its extended position,
   said second cooperating means including a cam on one of the die holder and workpiece holder that is movable relative to the one of the die holder and workpiece holder between first and second preselected positions,
   said second cooperating means further including means on the other of the die holder and workpiece holder for engaging the cam so that the cam and cam engaging means effect the requisite movement of the workpiece holder as an incident of the die holder moving between its extended and retracted positions; and
   means associated with said cam for maintaining said workpiece holder in its release position as an incident of said die holder being moved from its extended position towards its retracted position.

2. The die press according to claim 1 including a cutting die and means for mounting the cutting die on the die holder so that the cutting die engages a workpiece in operating position on the bed as the die holder is moved from its retracted position towards its extended position.

3. The die press according to claim 2 wherein there is an opening in the bed for reception of the cutting die with the die holder in its extended position to permit passage of at least part of the cutting die completely through a workpiece in operating position on said bed without interference between the cutting die and bed.

4. The die press according to claim 1 wherein said second cooperating means includes means on the bed for biasably maintaining the workpiece holder in its holding position as the die holder is moved from its retracted position towards its extended position.

5. The die press according to claim 1 wherein said second cooperating means includes a guide rod, means for mounting the workpiece holder on the guide rod, cooperating means on the bed and guide rod for guiding movement of the guide rod relative to the bed between (a) a first position wherein the workpiece holder is held by the guide rod in its holding position and (b) a second position wherein the workpiece holder is held by the guide rod in its release position, and a heel carried by the guide rod for engaging the die holder and being shifted by the die holder to move the rod from its second position to its first position as the die holder is moved from its retracted position to its extended position.

6. A die press comprising:
   a bed;
   means on the bed for supporting a workpiece on which an operation is to be performed by the die press in an operating position;
   a die holder;
   first cooperating means on the bed and die holder for guiding the die holder in movement between (a) a retracted position and (b) an extended position;
   a workpiece holder;

means for mounting the workpiece holder to the bed for movement relative to the bed between (a) a holding position and (b) a release position, said workpiece holder situated to maintain a workpiece in said operating position with the workpiece holder in its holding position; and second cooperating means on the die holder, bed and workpiece holder for moving the workpiece holder from the release position to the holding position as an incident of the die holder moving from its retracted position towards its extended position, said second cooperating means includes means for moving the workpiece holder from its holding position to its release position as an incident of the die holder realizing the extended position, said first cooperating means includes means for maintaining the workpiece holder in its release position as the die holder is moved from its extended position towards its retracted position.

7. The die press according to claim 6 wherein said second cooperating means includes means on the bed for normally biasing the workpiece holder towards its release position.

8. A die press comprising:
a bed;
means on the bed for supporting a workpiece on which an operation is to be performed by the die press in an operating position;
a die holder;
a cam having a first surface and a second surface;
means for mounting the cam on the die holder;
first cooperating means on the ed and die holder for guiding the die holder in movement between (a) a retracted position and (b) an extended position;
a workpiece holding assembly including a workpiece holder; and
means for mounting the workpiece holder to the bed for movement relative to the bed between (a) a holding position and (b) a release position,
said workpiece holder situated to maintain a workpiece in said operating position with the workpiece holder in its holding position,
said cam first surface engaging the workpiece holding assembly and causing the workpiece holder to move from its release position to its holding position as the die holder is moved from its retracted position to its extended position,
said means mounting the cam to the die holder mounts the cam for pivoting movement relative to the die holder between (a) an operative position and (b) a reset position,
said cam second surface engages the workpiece holding assembly such that the cam is moved from its operative position to its reset position by the workpiece holding assembly acting against said second cam surface to maintain the workpiece holder in its release position as an incident of the die holder moving from its extended position toward its retracted position.

9. The die press according to claim 8 wherein said workpiece holder resides in its release position with the cam in its reset position.

10. A die press comprising:
a bed;
means on the bed for supporting a workpiece on which an operation is to be performed by the die press in an operating position;
a die holder;
first cooperating means on the bed and die holder for guiding the die holder in movement between (a) a retracted position and (b) an extended position;
a workpiece holder;
means for mounting the workpiece holder to the bed for movement relative to the bed between (a) a holding position and (b) a release position,
said workpiece holder situated to maintain a workpiece in said operating position with the workpiece holder in its holding position; and
second cooperating means on the die holder, bed and workpiece holder for moving the workpiece holder from the release position to the holding position as an incident of the die holder moving from its retracted position towards its extended position,
wherein said second cooperating means includes a guide rod, means for mounting the workpiece holder on the guide rod, cooperating means on the bed and guide rod for guiding movement of the guide rod relative to the bed between (a) a first position wherein the workpiece holder is held by the guide rod in its holding position and (b) a second position wherein the workpiece holder is held by the guide rod in its release position, and a heel carried by the guide rod for engaging the die holder and being shifted by the die holder to move the rod from its second position to its first position as the die holder is moved from its retracted position to its extended position,
wherein said second cooperating means includes a cam on the die holder and means for mounting the cam to the die holder for movement relative to the die holder between (a) an operative position and (b) a reset position, there being a first surface on the cam to engage and move the heel with the cam in its operative position to cause the guide rod to move from its second position to its first position as an incident of the die holder moving from its retracted position to its extended position, and a second surface on said cam which engages the heel so that the heel moves the cam from its operative position to its reset position such that said workpiece holder is maintained in its release position as an incident of the die holder moving from its extended position to its retracted position.

11. The die press according to claim 10 wherein spring means are provided on the die holder for normally biasing the cam into its operative position.

12. The die press according to claim 10 wherein said cam mounting means mounts the cam for pivoting movement relative to the die holder.

13. A die press comprising:
a bed;
means on the bed for supporting a workpiece on which an operation is to be performed by the die press in an operating position;
a die holder;
a cam having a first surface and a second surface;
means for mounting the cam on the die holder for movement relative to the die holder between first and second positions;
first cooperating means on the bed and die holder for guiding the die holder in movement between (a) a retracted position and (b) an extended position;
a workpiece holding assembly including a workpiece holder; and means for mounting the workpiece holder to the bed for movement relative to the bed between (a) a holding position and (b) a release position, said workpiece holder situated to maintain a workpiece in said operating position with the workpiece holder in its holding position, said cam first surface engaging the workpiece holding assembly and causing the workpiece holder to move from its release position to its holding position as the die holder is moved from its retracted position to its extended position with the cam in its first position, said cam second surface engaging the workpiece holding assembly such that said workpiece holder is caused to maintain its release position as an incident of the die holder moving from its extended position to its retracted position.

14. The die press according to claim 13 wherein means are provided for biasing the workpiece holder into its release position.

15. The die press according to claim 13 wherein said die holder is mounted for linear movement between its extended and retracted positions, the workpiece holder is mounted for linear movement between its holding and release positions and the lines of movement of the die holder and workpiece holder are transverse to each other.

16. The die press according to claim 15 wherein the lines of movement of the workpiece holder and die holder are at right angles to each other.

* * * * *